United States Patent
Tsai et al.

(10) Patent No.: US 10,523,377 B2
(45) Date of Patent: Dec. 31, 2019

(54) WIRELESS COMMUNICATING METHOD AND ASSOCIATED WIRELESS COMMUNICATION DEVICE

(71) Applicant: MEDIATEK INC., Hsin-Chu (TW)

(72) Inventors: Chia-Hung Tsai, Santa Clara, CA (US); Weisung Tsao, Fremont, CA (US); Shihchieh Lee, Mountain View, CA (US); Cheng-Hsi Marik Hsiao, Santa Clara, CA (US); Chung-Ta Ku, Kaohsiung (TW); Po-Yuen Cheng, San Jose, CA (US)

(73) Assignee: MEDIATEK INC., Hsin-Chu (TW)

(*) Notice: Subject to any disclaimer, the term of this patent is extended or adjusted under 35 U.S.C. 154(b) by 0 days.

(21) Appl. No.: 15/690,244

(22) Filed: Aug. 29, 2017

(65) Prior Publication Data

US 2018/0069670 A1    Mar. 8, 2018

Related U.S. Application Data

(60) Provisional application No. 62/383,501, filed on Sep. 5, 2016.

(51) Int. Cl.
| | |
|---|---|
| H04L 5/00 | (2006.01) |
| H04W 24/08 | (2009.01) |
| H04W 72/04 | (2009.01) |
| H04W 72/08 | (2009.01) |
| H04W 84/12 | (2009.01) |
| H04W 88/08 | (2009.01) |

(52) U.S. Cl.
CPC .......... *H04L 5/0007* (2013.01); *H04L 5/0053* (2013.01); *H04L 5/0096* (2013.01); *H04W 24/08* (2013.01); *H04W 72/0486* (2013.01); *H04W 72/085* (2013.01); *H04L 5/0087* (2013.01); *H04W 84/12* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 2015/0078222 A1 | 3/2015 | Yang | |
| 2016/0150058 A1* | 5/2016 | Wentink | H04L 69/22 370/474 |
| 2016/0165607 A1* | 6/2016 | Hedayat | H04W 72/0453 370/338 |
| 2016/0345349 A1* | 11/2016 | Ferdowsi | H04W 72/1268 |
| 2018/0183640 A1* | 6/2018 | Cariou | H04L 5/0048 |

FOREIGN PATENT DOCUMENTS

| | | |
|---|---|---|
| CN | 106105312 A | 11/2016 |
| TW | 201214998 A1 | 4/2012 |
| TW | 201406107 A | 2/2014 |

* cited by examiner

*Primary Examiner* — Mohammad S Adhami
(74) *Attorney, Agent, or Firm* — Winston Hsu

(57) ABSTRACT

A wireless communication method includes setting at least one specific subfield of a control field in a report frame, and transmitting the report frame to an access point for communicating with the access point on uplink (UL) Orthogonal Frequency-Division Multiple Access (OFDMA). In addition, the wireless communication method is performed by a program code loaded from a storage device of a wireless communication device and executed by a processor of the wireless communication device.

18 Claims, 18 Drawing Sheets

| B0 | B1 | B2 B3 | B4 B7 | B8 | B9 | B10 | B11 | B12 | B13 | B14 | B15 |
|---|---|---|---|---|---|---|---|---|---|---|---|
| Protocol version | Type | Subtype | ToDS | From DS | More fragments | Retry | Power management | More data | Protected frame | Order | |

| B0 | B1 B2 | B3 B4 B7 | B8 | B9 | B10 | B11 | B12 | B13 | B14 | B15 |
|---|---|---|---|---|---|---|---|---|---|---|
| Protocol version | Type | Subtype | ToDS | From DS | More fragments | Retry | Power management | More data | Protected frame | Order |

FIG. 1

| Type | | Subtype | |
|---|---|---|---|
| 10 | Data | 1000 | QoS Data |
| 10 | Data | 1001 | QoS Data + CF-Ack |
| 10 | Data | 1010 | QoS Data + CF-Poll |
| 10 | Data | 1011 | QoS Data +CF-Ack+CF-Poll |
| 10 | Data | 1100 | QoS Null (no data) |
| 10 | Data | 1101 | Reserved |
| 10 | Data | 1110 | QoS CF-Poll(no data) |
| 10 | Data | 1111 | QoS CF-Ack+CF-Poll (no data) |
| 11 | Reserved | 0000-1111 | Reserved |

FIG. 2

| Bits | 0000 | 0001 | 0010 | 0011 | 0100 | 0101 | 0110~1111 |
|---|---|---|---|---|---|---|---|
| | General purpose | Short packet | Collision | Bursty | Latency | Collision Rate | Reserved |

FIG. 3

| B0  B3 | B4 | B5  B6 | B7 | B8  B15 |
|---|---|---|---|---|
| Traffic Identifier (TID) | End of Service Period (EOSP) | ACK Policy | Reserved | TXOP limit/TXOP duration /AP PS buffer state/Queue Size |

FIG. 4

| Control ID value | Meaning | Length of the Control Information subfield (bits) | Content of the Control Information subfield |
|---|---|---|---|
| 0 | UL MU response scheduling | 26 | See 9.2.4.6.4.2 (UL MU response scheduling) |
| 1 | Operating Mode(#2209) | 16 | See 9.2.4.6.4.3 (Operating Mode(#2209)) |
| 2 | HE link adaptation | TBD | See 9.2.4.6.4.4 (HE link adaptation) |
| 3 | Buffer Status Report(BSR)(#824) | 26 | See 9.2.4.6.5 (Buffer Status Report(BSR)(#824)) |
| 4 | UL Power Headroom(#340) | 8 | See 9.2.4.6.5.1 (UL power headroom) |
| 5-15 | Reserved | | |

FIG. 12

Short packet

| ACI Bitmap | Delta TID | ACI High | Scaling Factor | Interval | Scaling Factor | Duration | Queue Size All |
|---|---|---|---|---|---|---|---|
| B0 B3 | B4 B5 | B6 B7 | B8 B9 | B10 B15 | B16 B17 | B18 B23 | B24 B31 |

FIG. 13

Bursty

| B0  B3 | B4  B5 | B6  B7 | B8  B9 | B10  B15 | B16  B17 | B18  B23 | B24  B31 |
|---|---|---|---|---|---|---|---|
| ACI Bitmap | Delta TID | ACI High | Scaling Factor | Packet Size | Scaling Factor | Duration | Queue Size All |

FIG. 15

| Tolerant Latency | | | | | | | |
|---|---|---|---|---|---|---|---|
| ACI Bitmap | Delta TID | ACI High | Scaling Factor | Latency | Scaling Factor | Queue Size | Queue Size All |
| B0  B3 | B4  B5 | B6  B7 | B8  B9 | B10  B15 | B16  B17 | B18  B23 | B24  B31 |

FIG. 16

WIRELESS COMMUNICATING METHOD AND ASSOCIATED WIRELESS COMMUNICATION DEVICE

CROSS REFERENCE TO RELATED APPLICATIONS

This application claims the benefit of U.S. Provisional Application No. 62/383,501, which was filed on Sep. 5, 2016, and is incorporated herein by reference.

BACKGROUND

IEEE 802.11 is a set of media access control (MAC) and physical layer (PHY) specification for implementing wireless local area network (WLAN) computer communication in Wi-Fi frequency bands (2.4, 3.6, 5, and 60 GHz). This standard provides the basis for wireless network products using the Wi-Fi frequency bands. For example, IEEE 802.11ac is a wireless networking standard in the 802.11 family, providing high-throughput WLANs on the 5 GHz band. Significant wider channel bandwidths (20 MHz, 40 MHz, 80 MHz, and 160 MHz) were proposed in the IEEE 802.11ac standard. The High Efficiency WLAN study group (HEW SG) is a study group within the IEEE 802.11 working group for considering the improvement of spectrum efficiency to enhance system throughput in high-density scenarios of wireless devices. TGax was formed in response to HEW SG, and tasked to work on the IEEE 802.11ax standard, which will become a successor to IEEE 802.11ac.

IEEE802.11ax seeks throughput enhancement in the dense deployed environment. Specifically, uplink (UL) and downlink (DL) user aggregation has been introduced to increase network efficiency. Transmission by UL Orthogonal Frequency Division Multiple Access (OFDMA) for non-access point (AP) stations can alleviate collision, and also enhance performance such as throughput rate and latency.

SUMMARY

One of the objectives of the present invention is to provide a wireless communicating method for communicating with an access point (AP) on uplink (UL) Orthogonal Frequency Division Multiple Access (OFDMA) and an associated wireless communication device.

According to an embodiment of the present invention, a wireless communication method is disclosed, comprising: setting at least one specific subfield of a control field in a report frame; and transmitting the report frame to an access point for communicating with the access point on uplink (UL) Orthogonal Frequency-Division Multiple Access (OFDMA).

According to an embodiment of the present invention, a wireless communication device is disclosed, comprising: a storage device and a processor. The storage device is arranged to store a program code. The processor is arranged to execute the program code; wherein when loaded and executed by the processor, the program code instructs the processor to execute the following steps: setting at least one specific subfield of a control field in a report frame; and transmitting the report frame to an access point for communicating with the access point on uplink (UL) Orthogonal Frequency-Division Multiple Access (OFDMA).

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1 is a diagram illustrating a frame control field of a MAC header.

FIG. 2 is a diagram illustrating defined values of a type and subtype field.

FIG. 3 is a diagram illustrating values of the subtype field and corresponding reasons for UL OFDMA according to an embodiment of the present invention.

FIG. 4 is a diagram illustrating a QoS control field of the MAC header.

FIG. 12 is a diagram illustrating defined values of a control ID field and the length of a control information field corresponding to defined values of the control ID field.

FIG. 13 is a diagram illustrating information carried by the control information field of the HT field with respect to short packets according to an embodiment of the present invention.

FIG. 15 is a diagram illustrating information carried by the control information field of the HT field with respect to bursty according to an embodiment of the present invention.

FIG. 16 is a diagram illustrating information carried by the control information field of the HT field with respect to latency according to an embodiment of the present invention.

DETAILED DESCRIPTION

Figure 5:
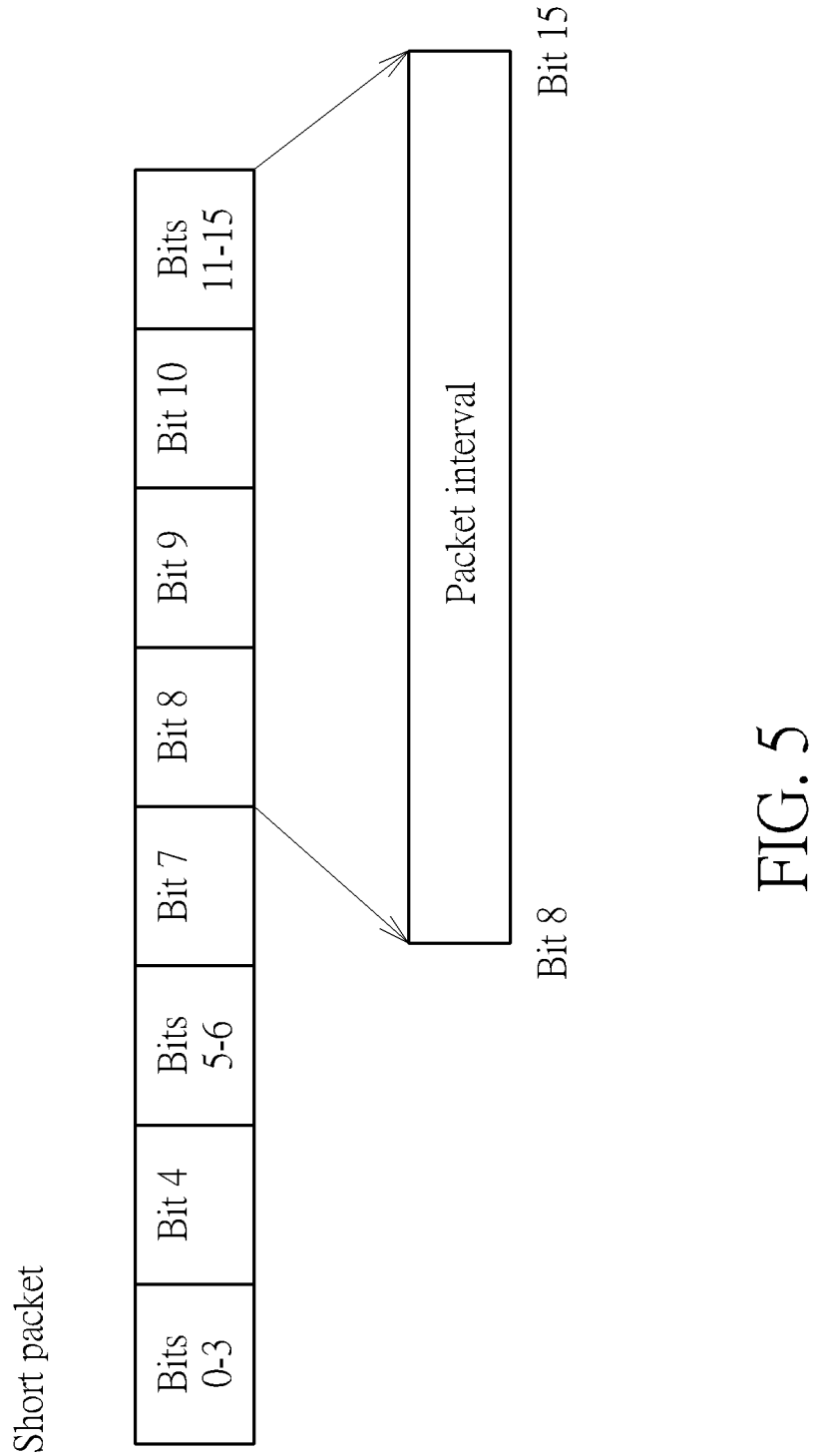
FIG. 5 is a diagram illustrating information relating to short packets according to an embodiment of the present invention.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should not be interpreted as a close-ended term such as "consist of". Also, the term "couple" is intended to mean either an indirect or direct electrical connection. Accordingly, if one device is coupled to another device, that connection may be through a direct electrical connection, or through an indirect electrical connection via other devices and connections.

As mentioned above, UL OFDMA can effectively enhance communication performance by, for example, alleviating collision which frequently occurs in communication between a station (STA) and an access point (AP). When the channel condition becomes poor, due to severe collision, or high traffic latency, only the STA side will acknowledge the condition, whereas the AP will not usually learn the poor channel condition the STA is suffering from. Consequently, the AP will not automatically provide UL OFDMA to the STA. The present invention proposes a wireless communication method for the STA to preferably ask for UL OFDMA from the AP by defining/using a reserved bit(s) on a media access control (MAC) control field to indicate the preference for using UL OFDMA. Reserved bits on the frame control field, the quality of service (QoS) control field or high throughput (HT) control field can be defined/used to indicate a preference for using UL OFDMA or for carrying some advanced information with respect to reasons for the STA using UL OFDMA.

Refer to FIG. 1 in conjunction with FIG. 2. FIG. 1 is a diagram illustrating the frame control field of the MAC header. As shown in FIG. 1, the frame control field comprises a plurality of subfields: the protocol version field, the type field, and the subtype field. The type field is 2 bits long and the subtype is 4 bits long, wherein the type field indicates whether the frame is control, management or data type, and the subtype defines the frame more precisely. FIG. 2 is a diagram illustrating some defined values of the type and subtype field, along with a corresponding description. From FIG. 2, it can be easily observed that the value '11' of the type field is reserved for future use. Therefore, the wireless communicating method for the STA proposed by the present invention sets the type field of the frame control field as the value '11' to indicate the preference for UL OFDMA while the subtype field of the frame control is used for indicating reasons for using UL OFDMA, which will be discussed later. FIG. 2 only shows part of the type and subtype field setting, as known so far. When the type field is set as '00', '01' and '10', representing the management frame, the control frame and the data frame respectively, any value of the subtype field will be assigned a specific purpose. For example, "probe request" is considered when the type field is set as '00' and the subtype field is set as '0100'. In another example, "block ACK request" is considered when the type field is set as "01" and the subtype field is set as "1000".

Details of other subfields comprised in the frame control field, such as the ToDS field, FromDS field, more fragments field, retry field, and power management field, can be easily found in the 802.11 standard. The more fragments field is set as '1' when more fragments are to follow, for example. The retry field is set as '1' when the frame is a retransmission of an earlier frame. The power management field is set as '1' when the STA will sleep and set as '0' when the STA will stay awake. The detailed description of other subfields of the frame control field is omitted here for brevity.

When the type field of the frame control field is set as '11' to indicate the preference for using UL OFDMA, the subtype field of the frame control field is used to indicate the reasons for using UL OFDMA. FIG. 3 is a diagram illustrating defined values of the subtype field and the corresponding reasons for UL OFDMA according to an embodiment of the present invention. As shown in FIG. 3, when the subtype field is set as '0001' this means "short packet", e.g. the report frame is a voice frame so the STA needs to be triggered every 20 ms. When the subtype field is set as '0010' this means "collision", so the STA reports the collision condition to the AP. When the subtype field is set as '0011' this means "bursty", so the STA reports to the AP that the current frame is a bursty data frame. When the subtype field is set as '0100' this means "latency", so the STA reports the latency condition to the AP. When the subtype field is set as '0010' this means "collision rate", so the STA can report the collision rate to the AP. When the subtype field is set as '0000' this means "general purpose". It should be noted that the examples described above are only for illustrative purposes. The defined values of the subtype field and the corresponding reasons for UL OFDMA are not limited by the present invention. Also, it should be noted that the embodiments described above utilize reserved bits in the frame control field to indicate the preference for using UL OFDMA; however, this is not a limitation of the present invention. In other embodiments, the indication can be achieved by using other reversed bits in different control fields, e.g. the HT control field. These alternative designs also fall within the scope of the present invention.

After indicating the reasons for using UL OFDMA, the wireless communicating method proposed by the present invention sets the reserved bits in the QoS control field to carry advanced information. FIG. 4 is a diagram illustrating the QoS control field of the MAC header. As shown in FIG. 4, the QoS control field comprises a plurality of subfields. The first subfield is the Traffic Identifier (TID) field and is 4 bits long; the second subfield is the End of Service Period (EOSP) field and is 1 bit long; the third subfield is the ACK Policy field and is 2 bits long; the fourth subfield is reserved for future use; and the fifth subfield is for TXOP limit/TXOP duration/AP PS buffer state/Queue Size and is 8 bits long. The wireless communicating method proposed by the present invention utilizes the fifth subfield of the QoS control field to carry advanced information for UL OFDMA, which will be discussed later.

The TID field is used to identify the user priority (UP) and traffic Access Category (AC) of a QoS data frame. 802.11 WMM clients use WMM-PS (power save) to indicate to an AP that the STA is awake. Unlike in legacy PS, WMM-PS STA can ask to deliver more than 1 frame. The EOSP field is used to indicate the end of a service period. If this bit is set to 1, the STA can go back to sleep. The ACL policy field is used to specify the 2-bit Acknowledgement policy. The TXOP limit in the fifth subfield is used to indicate the transmit opportunity granted by the AP. The TXOP duration in the fifth subfield is used to tell the AP how much time the STA wants for its next TXOP. The AP may also choose to assign a shorter TXOP. The AP PS buffer state in the fifth subfield is used for the AP to indicate a PS buffer state for the STA. The queue size in the fifth field is used to inform the AP how much buffered traffic it needs to send. The AP can use this information to determine duration of the next TXOP to the STA.

Figure 6:
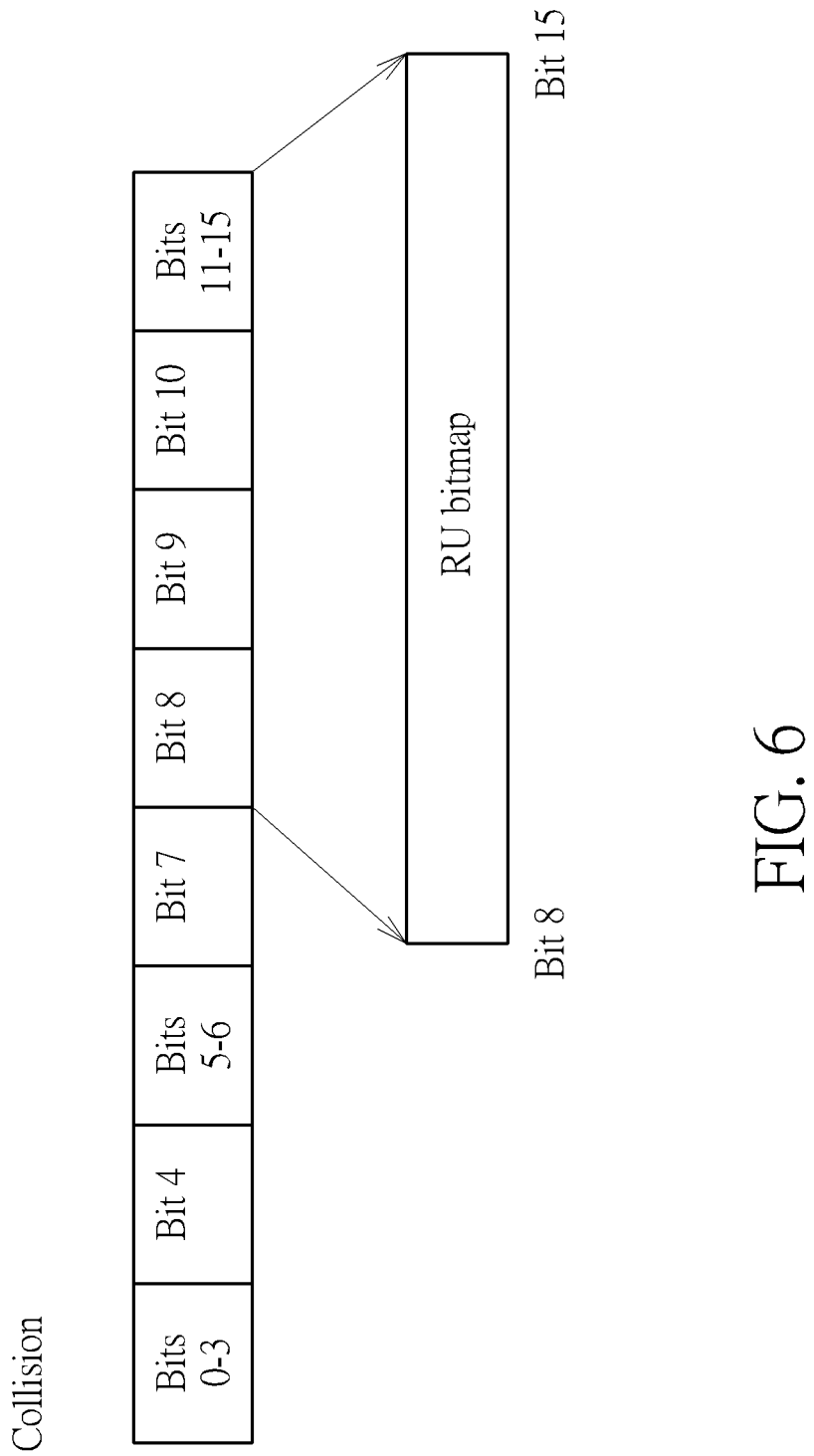
FIG. 6 is a diagram illustrating information relating to collision according to an embodiment of the present invention.
Figure 7:
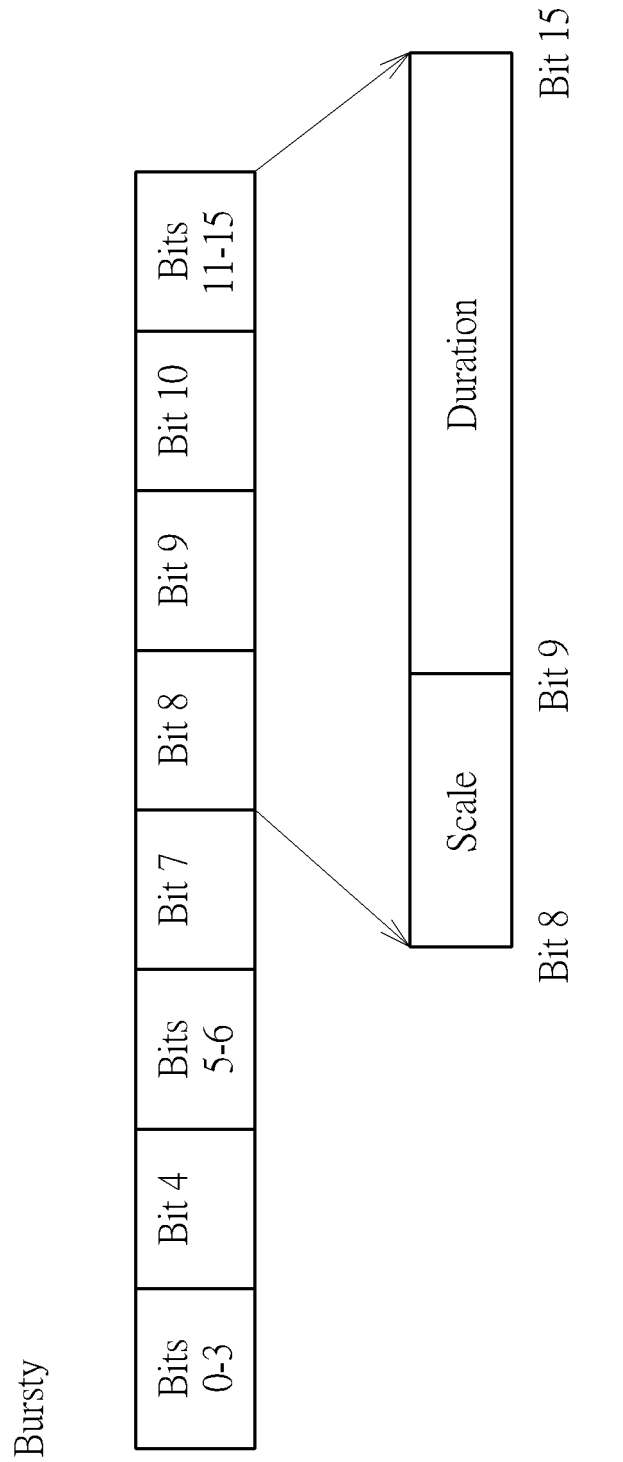
FIG. 7 is a diagram illustrating information relating to bursty according to an embodiment of the present invention.
Figure 8:
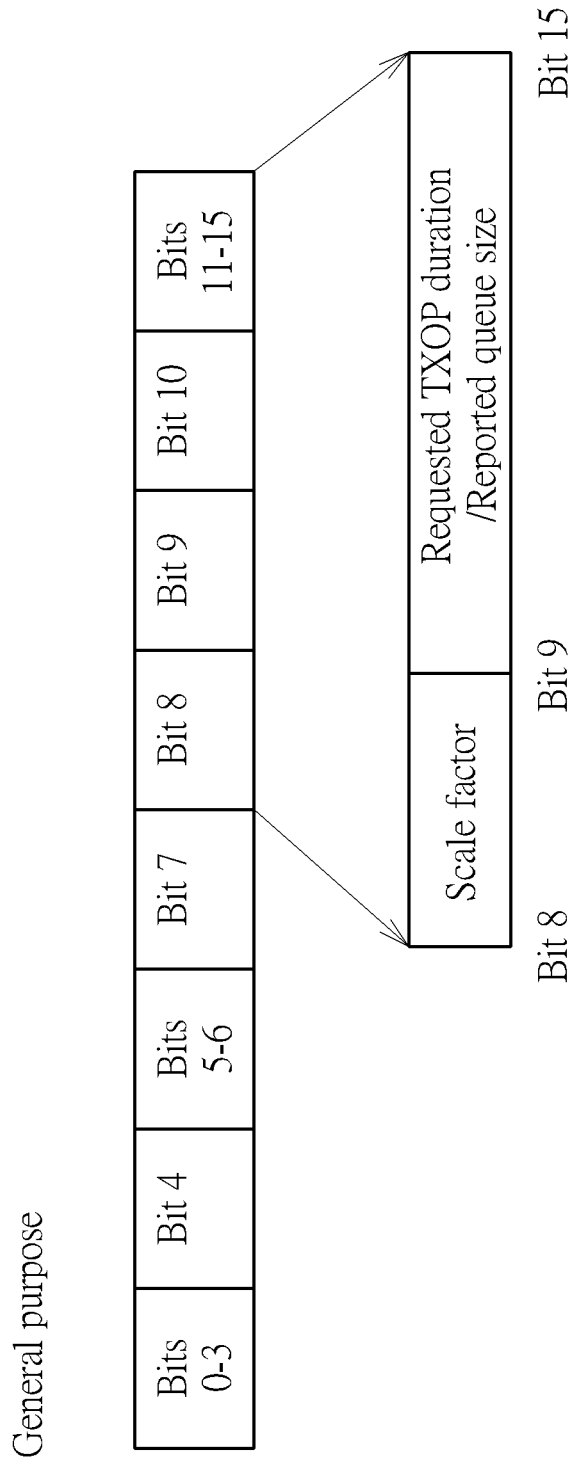
FIG. 8 is a diagram illustrating information relating to general purpose according to an embodiment of the present invention.
Figure 9:
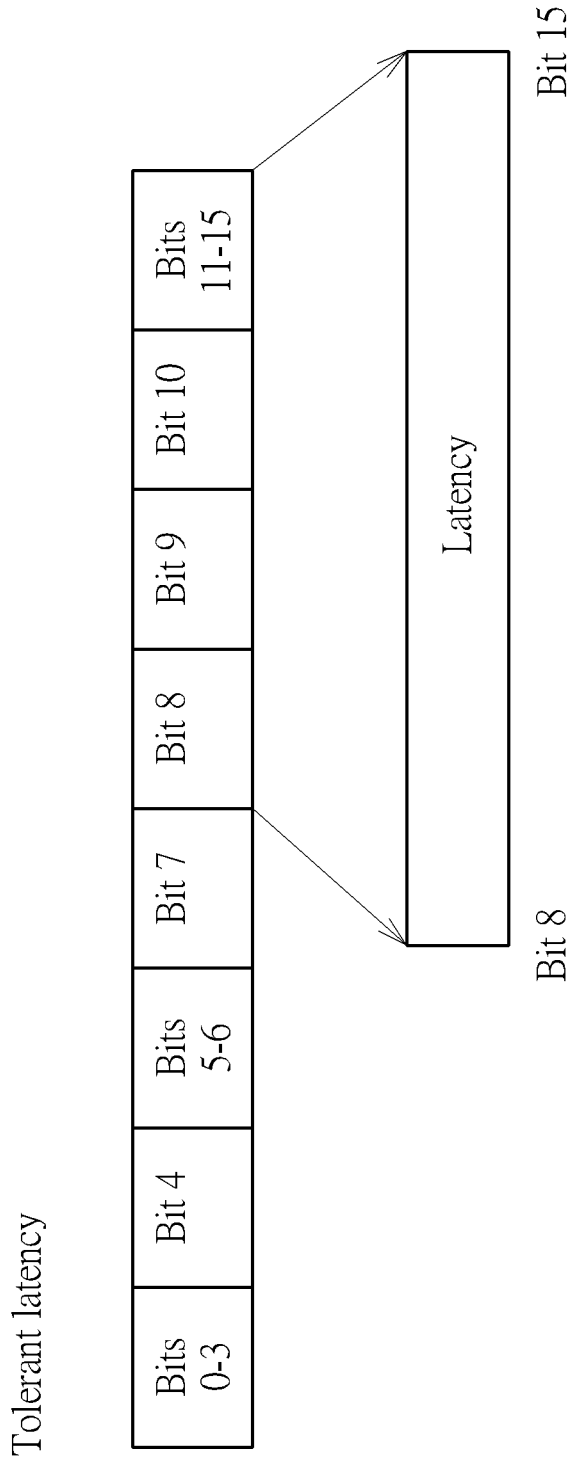
FIG. 9 is a diagram illustrating information relating to latency according to an embodiment of the present invention.
Figure 10:
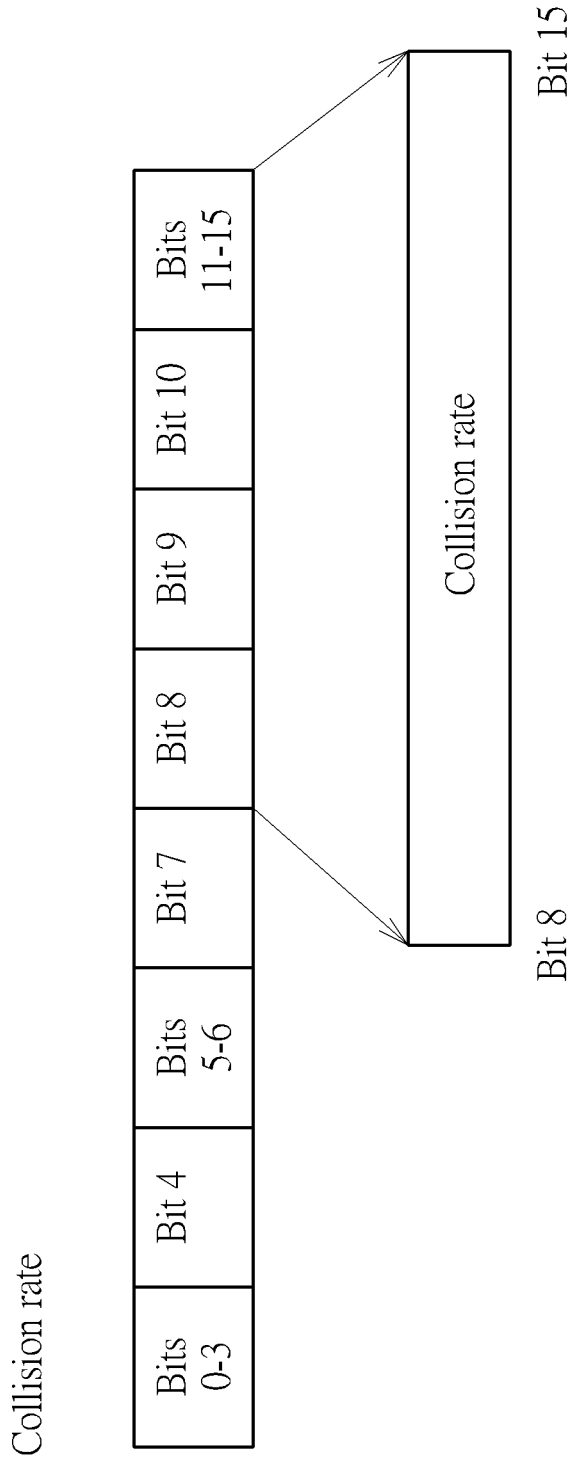
FIG. 10 is a diagram illustrating information relating to collision rate according to an embodiment of the present invention.

FIG. 5-FIG. 10 are diagrams illustrating information with respect to reasons for the UL OFDMA shown in FIG. 3. Referring to FIG. 5, when the type field is set as '11' while the subtype field is set as '0001' this means "short packet", and the fifth subfield comprising 8 bits in the QoS control field can be used to carry information indicative of the packet interval. For example, the information indicates that the requested packet interval is in units of 1 ms, so the AP learns it is a periodic packet, and schedules an UL OFDMA to the STA for each period. Referring to FIG. 6, when the type field is set as '11' while the subtype field is set as '0010' this means "collision", and the fifth subfield comprising 8 bits in the QoS control field can be used to carry information indicative of the resource unit (RU) bitmap. The information may indicate the RU allocation so the AP can learn which RU has severe collision, and thereby avoid assigning those RUs with severe collision to the STA on UL OFDMA. Referring to FIG. 7, when the type field is set as '11' while the subtype field is set as '0011' this means "Bursty", and the fifth subfield comprising 8 bits in the QoS control field can be used to carry information indicative of the requested duration, wherein the eighth bit (i.e. $B_8$) is used as a scale factor, and the remaining bits (i.e. $B_9$-$B_{15}$) are used to indicate the duration. For example, when the eighth bit is set as '0', the request duration is in units of 1 ms and assigned to the bits $B_9$ to $B_{15}$, and when the eighth bit is set as '1', the request duration is in units of 1 second and assigned to the bits $B_9$ to $B_{15}$. Referring to FIG. 8, when the type field is set as '11' while the subtype field is set as '0000' this means "general purpose", and the fifth subfield comprising 8 bits in the QoS control field can be used to carry information indicative of the requested TXOP duration or the reported queue size; this is well-known to those skilled in the art. The detailed description is thus omitted here. Referring to FIG. 9, when the type field is set as '11' while the subtype field is set as '0100' this means "latency", and the fifth subfield comprising 8 bits in the QoS control field can be used to carry information indicative of the tolerant latency in units of 1 ms. Referring to FIG. 10, when the type field is set as '11' while the subtype field is set as '0101' this means "collision rate", and the fifth subfield comprising 8 bits in the QoS control field can be used to carry information indicative of the collision rate.

It should be noted that the advanced information described in the embodiments of FIG. 5-FIG. 10 is only for illustrative purposes, and not a limitation of the present invention.

Figure 11:
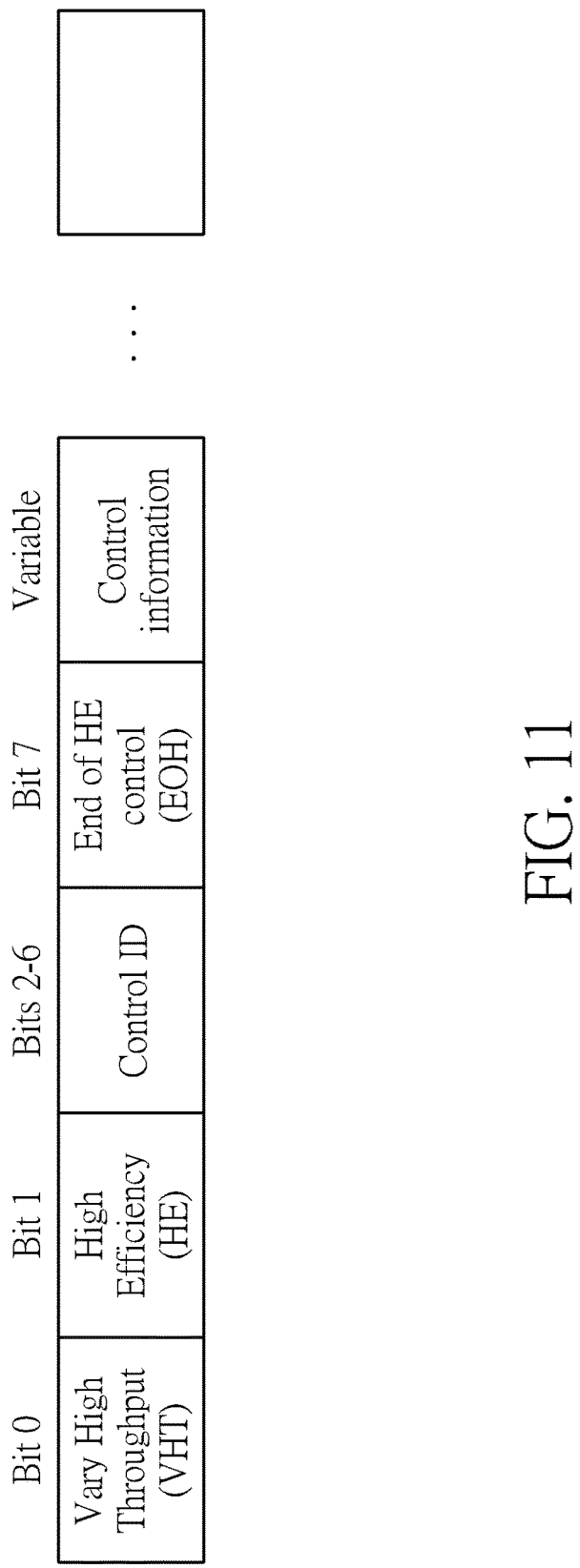
FIG. 11 is a diagram illustrating an HT control field of the MAC header.

The embodiments described above utilize reserved bits in the frame control field to indicate a preference for using UL OFDMA. The indication can also be achieved by using reversed bits in the HT control field. Refer to FIG. 11 in conjunction with FIG. 12. FIG. 11 is a diagram illustrating the HT control field of the MAC header. As shown in FIG. 11, the HT control field comprises a plurality of subfields: the very high throughput (VHT) field which is 1 bit long, the high efficiency field (HE) which is 1 bit long, the control ID field which is 5 bits long, the end of HE control field (EOH) field which is 1 bit long, and the control information field whose length is variable. FIG. 12 is a diagram illustrating defined values of the control ID field and the length of the control information field corresponding to the defined value of the control ID field, along with their detailed description. From FIG. 12, it can be easily observed that the value '5' to '15' (written in decimal form here) of the control ID field is reserved for future use. Similar to the embodiments of FIG. 2 and FIG. 3, the wireless communicating method for the STA proposed by the present invention can define reserved bits of the control ID field and the control information field in the HT control field to indicate the preference for using OFDMA and the reasons for UL OFDMA. Those skilled in the art should readily understand the operation after reading the abovementioned embodiments. The detail is omitted here for brevity. Similar to the embodiments of FIG. 5-FIG. 10, FIG. 13-FIG. 16 illustrates advanced information carried by the control information field of the HT field with respect to "short packet", "collision", "Bursty" and "latency", respectively, when the reserved bits of the control ID field are defined to indicate the preference for using OFDMA and the reasons for UL OFDMA.

Figure 14:
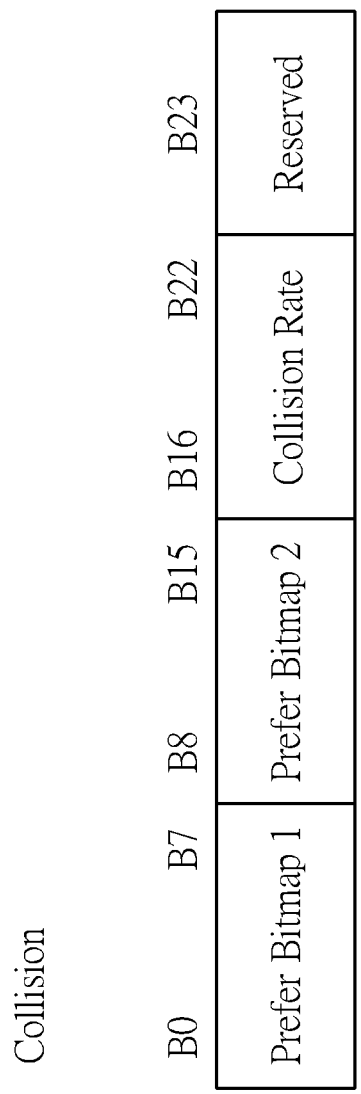
FIG. 14 is a diagram illustrating information carried by the control information field of the HT field with respect to collision according to an embodiment of the present invention.

Referring to FIG. 13, when the control ID field is set to indicate the preference for using UL OFDMA and reveal the reason as "short packet", the format of the control information field to carry advanced information including the packet interval is shown in FIG. 13, similar to the embodiment shown in FIG. 5. Referring to FIG. 14, when the control ID field is set to indicate the preference for using UL OFDMA and reveal the reason as "collision", the format of the control information field to carry advanced information including the RU bitmap is shown in FIG. 14, similar to the embodiment shown in FIG. 6. Referring to FIG. 15, when the control ID field is set to indicate the preference for using UL OFDMA and reveal the reason as "Bursty", the format of the control information field to carry advanced information including the requested TXOP duration is shown in FIG. 15, similar to the embodiment shown in FIG. 7. Referring to FIG. 16, when the control ID field is set to indicate the preference for using UL OFDMA and reveal the reason as "latency", the format of the control information field to carry the advanced information including the tolerant latency is shown in FIG. 16, similar to the embodiment shown in FIG. 9. Those skilled in the art should readily understand the embodiments of FIG. 13-FIG. 16 after reading the above paragraphs. The detailed description is omitted here for brevity.

Figure 17:
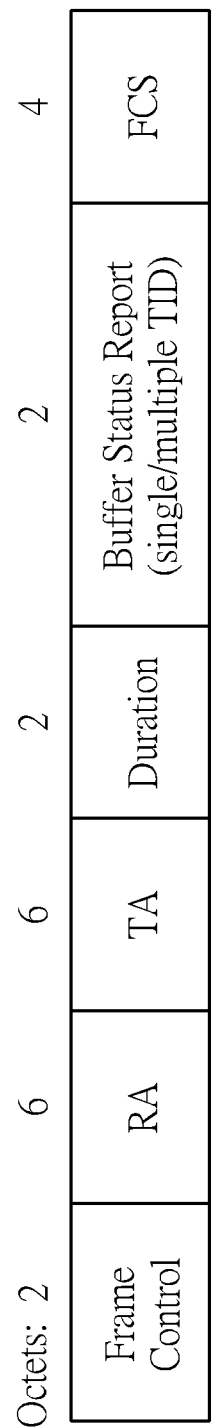
FIG. 17 is a diagram illustrating a new defined frame according to an embodiment of the present invention.

In another embodiment, the wireless communicating method for the SAT proposed by the present invention can use a new defined frame format or a new defined protocol version to indicate the preference for UL OFDMA, and further indicates the reasons for UL OFDMA. Referring to FIG. 17, for new frame, the wireless communicating method for the SAT proposed by the present invention uses type and subtype field in the frame control field to define new frame type. Since the new defined frame owns high flexibility, the advanced information can be carried in any subfield which is based on designer's consideration.

Briefly summarized, the wireless communicating method for the STA asking for UL OFDMA as proposed by the present invention sets reserved bits of the frame control field or the HT control field to indicate the preference for using UL OFDMA, and further indicates the reasons for UL OFDMA. Reserved bits in the Qos control field or the control information field of the HT control field are used to carry the advanced information.

Figure 18:
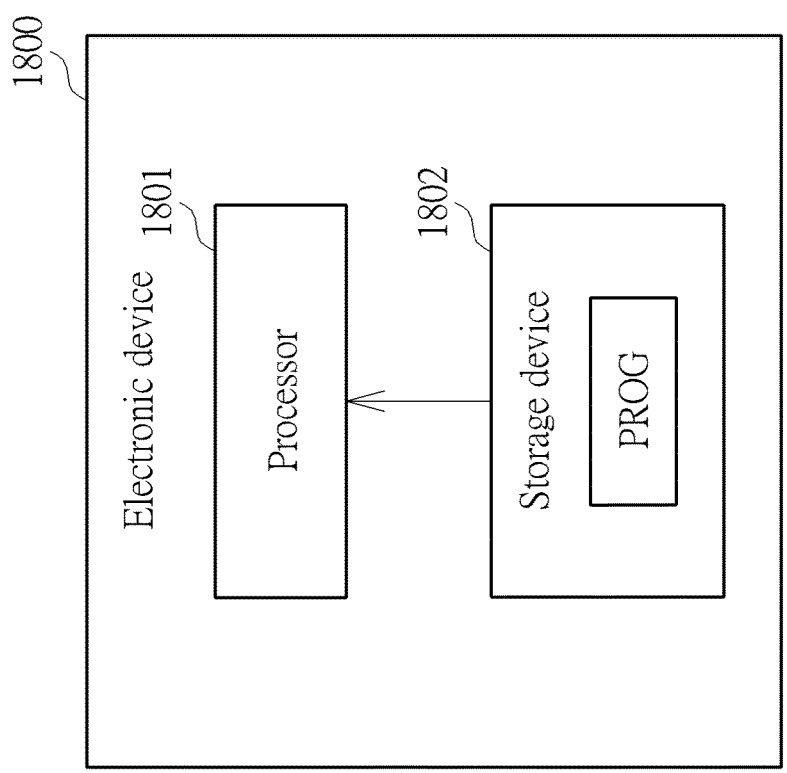
FIG. 18 is a diagram illustrating a wireless communication device according to an embodiment of the present invention.

FIG. 18 is a diagram illustrating a wireless communication device 1800 for performing the aforementioned wireless communicating method according to an embodiment of the present invention. The wireless communication device 1800 comprises a processor 1801 and a storage device 1802 storing a program code PROG. When the program code PROG is loaded and executed by the processor 1801, the wireless communicating method described in the embodiments of FIG. 1-FIG. 16 can be executed. One skilled in the art should readily understand the operation of the processor 1801 after reading the above paragraphs. The detailed description is therefore omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless communication method, comprising:
a station (STA) setting reserved bits in a specific subfield of a control field in a media access control (MAC) header of a frame to request uplink Orthogonal Frequency Division Multiple Access (UL OFDMA);
setting reserved bits in another specific subfield of the frame control field in the MAC header to indicate a reason for the UL OFDMA;
transmitting the frame from the STA to an access point (AP) for communicating with the access point on UL OFDMA; and
when the frame is received, setting the wireless communication as UL OFDMA.

2. The wireless communication method of claim 1, wherein the control field is a frame control field, the specific subfield comprises a type field, the other specific subfield comprises a subtype field, and the type field is set to notify the access point to start the UL OFDMA.

3. The wireless communication method of claim 2, wherein the subtype field is set to indicate a collision state to the access point.

4. The wireless communication method of claim 2, wherein the subtype field is set to indicate a collision rate to the access point.

5. The wireless communication method of claim 2, wherein the subtype field is set to indicate a latency state to the access point.

6. The wireless communication method of claim 2, wherein the subtype field is set to indicate a bursty state to the access point.

7. The wireless communication method of claim 2, wherein the subtype field is set to indicate a short packet state to the access point.

8. The wireless communication method of claim 2, wherein the MAC header further comprises a Quality of Service (QoS) control field, and reserved bits in a specific subfield of the QoS control field are set to indicate an information indicative of the reason described in the subtype field.

9. The wireless communication method of claim 1, wherein the control field is a high throughput (HT) control field, the specific subfield comprises a very high throughput (VHT) control field and a high efficiency (HE) control field, and the VHT field and the HE control field are set to notify the access point to start the UL OFDMA.

10. An electronic device, comprising:
a storage device, arranged to store a program code; and
a processor, arranged to execute the program code;
wherein when loaded and executed by the processor, the program code instructs the processor to execute the following steps:
a station (STA) setting reserved bits in a specific subfield of a control field in a media access control (MAC) header of a frame to request uplink Orthogonal Frequency Division Multiple Access (UL OFDMA;
setting reserved bits in another specific subfield of the frame control field in the MAC header to indicate a reason for the UL OFDMA;
transmitting the frame from the STA to an access point (AP) for communicating with the access point on UL OFDMA; and
when the frame is received, setting the wireless communication as UL OFDMA.

11. The electronic device of claim 10, wherein the control field is a frame control field, the specific subfield comprises a type field, the other specific subfield comprises a subtype field, and the type field is set to notify the access point to start the UL OFDMA.

12. The electronic device of claim 11, wherein the subtype field is set to indicate a collision state to the access point.

13. The electronic device of claim 11, wherein the subtype field is set to indicate a collision rate to the access point.

14. The electronic device of claim 11, wherein the subtype field is set to indicate a latency state to the access point.

15. The electronic device of claim 11, wherein the subtype field is set to indicate a bursty state to the access point.

16. The electronic device of claim 11, wherein the subtype field is set to indicate a short packet state to the access point.

17. The electronic device of claim 11, wherein the MAC header further comprises a Quality of Service (QoS) control field, and reserved bits in a specific subfield of the QoS control field are set to indicate an information indicative of the reason described in the subtype field.

18. The electronic device of claim 10, wherein the control field is a high throughput (HT) control field, the specific subfield comprises a very high throughput (VHT) control field and a high efficiency (HE) control field, and the VHT field and the HE control field are set to notify the access point to start the UL OFDMA.

* * * * *